(12) United States Patent
Fleischer et al.

(10) Patent No.: US 12,341,472 B2
(45) Date of Patent: Jun. 24, 2025

(54) PREDICTING A PERFORMANCE VALUE OF A SOLAR CELL FROM ELECTRICAL IMPEDANCE SPECTROSCOPY MEASUREMENTS

(71) Applicant: Siemens Energy Global GmbH & Co. KG, Bayern (DE)

(72) Inventors: Maximilian Fleischer, Hohenkirchen (DE); Roland Pohle, Herdweg (DE); Elfriede Simon, Munich (DE); Oliver von Sicard, Munich (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 312 days.

(21) Appl. No.: 17/794,973

(22) PCT Filed: Jan. 26, 2021

(86) PCT No.: PCT/EP2021/051727
§ 371 (c)(1),
(2) Date: Jul. 24, 2022

(87) PCT Pub. No.: WO2021/164995
PCT Pub. Date: Aug. 26, 2021

(65) Prior Publication Data
US 2023/0080896 A1    Mar. 16, 2023

(30) Foreign Application Priority Data
Feb. 18, 2020    (EP) .................................. 20157913

(51) Int. Cl.
*H02S 50/00*    (2014.01)
(52) U.S. Cl.
CPC .................................. *H02S 50/00* (2013.01)
(58) Field of Classification Search
CPC ................................ H02S 50/00; Y02E 10/50
See application file for complete search history.

(56) References Cited

U.S. PATENT DOCUMENTS

2015/0188415 A1*    7/2015    Abido .................... G06N 3/043
                                                    307/103
2015/0303347 A1*    10/2015    Boettcher ......... H01L 21/02631
                                                    438/491

(Continued)

FOREIGN PATENT DOCUMENTS

CN    105406818 A    3/2016
CN    107192759 A    9/2017

(Continued)

OTHER PUBLICATIONS

PCT International Search Report and Written Opinion of International Searching Authority mailed Mar. 2, 2021 corresponding to PCT International Application No. PCT/EP2021/051727 filed Jan. 26, 2021.

*Primary Examiner* — Giovanni Astacio-Oquendo
*Assistant Examiner* — Haidong Zhang
(74) *Attorney, Agent, or Firm* — Wolter Van Dyke Davis, PLLC

(57) ABSTRACT

A computer-implemented method and system provides output data, wherein the output data includes a performance value of a perovskite-based solar cell. The method includes: (i) receiving input data, wherein the input data includes data from electrical impedance spectroscopy carried out on the solar cell or parts thereof, (ii) applying a trained function to the input data, wherein the output data is generated and (iii) providing the output data. A computer-implemented method also provides a trained function which is able to predict a performance value of a perovskite-based solar cell based on electrical impedance spectroscopy carried out on the solar cell or parts thereof.

13 Claims, 2 Drawing Sheets

(56) References Cited

U.S. PATENT DOCUMENTS

| | | | |
|---|---|---|---|
| 2017/0033735 A1* | 2/2017 | Tsuda | H02S 50/00 |
| 2018/0247769 A1* | 8/2018 | Qi | H10K 85/50 |
| 2022/0052639 A1 | 2/2022 | Fleischer et al. | |

FOREIGN PATENT DOCUMENTS

| | | |
|---|---|---|
| CN | 107359860 A | 11/2017 |
| CN | 110224673 A | 9/2019 |
| JP | 2020005473 A | 1/2020 |
| WO | 2019202341 A1 | 10/2019 |

\* cited by examiner

PREDICTING A PERFORMANCE VALUE OF A SOLAR CELL FROM ELECTRICAL IMPEDANCE SPECTROSCOPY MEASUREMENTS

CROSS REFERENCE TO RELATED APPLICATIONS

This application is the US National Stage of International Application No. PCT/EP2021/051727 filed 26 Jan. 2021, and claims the benefit thereof. The International Application claims the benefit of European Application No. EP20157913 filed 18 Feb. 2020. All of the applications are incorporated by reference herein in their entirety.

TECHNICAL FIELD OF INVENTION

The invention relates to a computer-implemented method for predicting a performance value of a perovskite-based solar cell based on electrical impedance spectroscopy carried out on the solar cell or parts thereof. Furthermore, the invention relates to a computer-implemented method for providing a trained function which involves training a function which is able to predict a performance value of a perovskite-based solar cell based on electrical impedance spectroscopy carried out on the solar cell or parts there-of. Further, the invention relates to a corresponding providing system and a corresponding computer-readable medium.

BACKGROUND OF THE INVENTION

Perovskite-based solar cells are a new, promising photovoltaic technology. During a relatively short time of development, cell efficiencies above 25% have been achieved on a laboratory scale. This is competitive with regard to record efficiencies of conventional multicrystalline or monocrystalline silicon solar cells, which are in a range of 23% and 26% on lab scale, respectively. For tandem setups comprising a perovskite-based solar cell and a silicon solar cell, a record photoconversion efficiency of 28% has already been demonstrated.

Nonetheless, upscaling the manufacturing of perovskite-based solar cells and corresponding photovoltaic represent new challenges. In contrast to the widely available and well-established processes for the manufacturing of silicon-based solar cells, the manufacturing process of perovskite-based solar cells still needs to be optimized. For the manufacturing of tandem solar cells even more manufacturing process steps have to be established, some of which are even not developed yet for large industrial scale.

Precise monitoring of perovskite-based solar cells during the sequential manufacturing process steps and analysis of deviations in performance traced back to specific process steps would enable cost efficient process development and production of perovskite-based solar cells.

Today, in order to judge the performance of perovskite-based solar cells quantitatively, the fully processed cell is characterized in a controlled environment under exactly known illumination. Concretely, an I(V)-curve (current-voltage-curve) of the cell is recorded at a solar simulator, which is a device that provides illumination approximating natural sunlight. Subsequently, the main performance values of the tested solar cell are deduced thereof.

However, this procedure requires significant invest, is time consuming and needs to be carried out at the fully processed solar cell. In other words, there is no established fast and reliable way to check the interim steps of the perovskite-based solar cell production chain. To evaluate the quality of the process, all preparation steps must be followed through and the characterization of the resulting cell performance can only take place once the solar cell has been finished. Typically, the 1-V measurements at full illumination are carried out according to established standards such as IEC 60904-9. These measurements are used to evaluate the main performance parameters of the perovskite-based solar cell.

Thus, there exists the desire to develop a concept how to predict the performance of a perovskite-based solar cell in an alternative manner compared to the state of the art. Ideally, the results may be used to monitor and optimize the processing of the solar cell faster and more directly.

SUMMARY OF THE INVENTION

This objective is achieved by the subject-matters of the independent claims. Advantageous embodiments and variations are disclosed in the dependent claims and the description.

According to the invention, there is provided a computer-implemented method for providing output data, wherein the output data comprises a performance value of a solar cell and the solar cell comprises perovskite material. The method comprising the following steps:
  receiving input data, wherein the input data comprises data from electrical impedance spectroscopy carried out on the solar cell or parts thereof,
  applying a trained function to the input data, wherein the output data is generated and
  providing the output data.

A key aspect of the present invention is the use of electrical impedance spectroscopy to predict one or more performance values of the perovskite-based solar cell. Using electrical impedance spectroscopy is attractive, because it does not need to be carried out on a fully manufactured (in other words: fully processed) solar cell but can in principle also be carried out on intermediate cell material, i.e. before the completion of the processing of the cell. In other words, the electrical impedance spectroscopy measurements may be carried out on the fully processed or partly processed solar cell.

Electrical impedance spectroscopy (EIS) is a technique for evaluating the current response to the application of an alternating voltage as a function of frequency. In particular, EIS measures the resistance and capacitance properties of a material via application of a sinusoidal alternating excitation signal in the range of e.g. 2-10 mV. An impedance spectrum is obtained by varying the frequency over a predefined range. For instance, EIS is known to investigate the kinetics of electrical processes, including the clarification of relevant ionic and electronic processes that occur at different interfaces in various electrical devices.

However, EIS has never been used to predict a performance value of a solar cell so far, in particular of a perovskite-based solar cell.

EIS does not require a solar simulator, compared to conventional I-V measurements. Instead, EIS measurements may be carried out at low light or even at no illumination at all.

The electrical impedance spectroscopy may for example be carried out at frequencies in the range between 100 milli Hertz (mHz), i.e. 0.1 Hz, and 1 Mega Hertz (MZh), i.e. 1 000 000 Hz.

In an advantageous embodiment of the invention, the electrical impedance spectroscopy is carried out at a limited number of pre-defined frequencies. This has the advantage that the measurement time may be significantly reduced. Measurement times in the range between a few seconds down to smaller than 1 second may thus be achieved. This has the advantage that the EIS measurements may potentially be carried out inline during the manufacturing process of the perovskite-based solar cell. Advantageously, the frequencies are chosen such that they are well suited to characterize the tested material and thus are able to form the basis of performance value predictions. Choosing the suitable frequencies is typically facilitated in practice, because, as normally the same cell type is manufactured along one production process, the best suited frequencies are known.

The EIS measurements are carried out on the solar cell or parts thereof. The solar cell does not need to be fully manufactured yet. For example, anti-reflection coating does not need to be applied yet. Furthermore, the front contact (e.g. transparent conducting oxide, TCO) does not need to be applied yet either. As a voltage needs to be applied to the material, some type of contact needs to be present, though. If the solar cell's contact does not exist yet, there can, for instance, be provided a small dot-like contact e.g. at the border, in particular at a corner, of the solar cell material. In principle, even the back contact (e.g. realized by entirely covering the back side of the solar cell with aluminum) can be substituted by a test structure.

The purpose of the method according to the invention is to predict a performance value of a perovskite-based solar cell. A perovskite-based solar cell may also be denoted as a perovskite solar cell, or PSC in short. In particular, the solar cell comprises a photosensitive layer and the photosensitive layer contains the perovskite material.

A perovskite-based solar cell is a type of solar cell which includes a perovskite structured compound, most commonly a hybrid organic-inorganic lead or tin halide-based material, as the light-harvesting active layer, i.e. the photosensitive layer. The general chemical structure of the perovskite is $ABX_3$ and a common specification is $(CH_3NH_3)PbX_3$.

As input data, the inventive method proposes to use data from electrical impedance spectroscopy carried out on the solar cell or parts thereof.

In one embodiment of the invention, the input data, i.e. the EIS data, comprises impedance, admittance, modulus function, complex dielectric constant and/or dielectric permittivity of the solar cell or parts thereof. These data may in principle be deduced from the Nyquist or Bode plots of the EIS measurements.

In another embodiment of the invention, the input data are derived from modelling one or more electrical equivalent circuits based on the electrical impedance spectroscopy carried out on the solar cell or parts thereof. From the modelled electrical equivalent circuit(s), parameters such as the serial resistance, the capacity or the Warburg impedance of the solar cell or parts thereof can be deduced. These parameters may then be used as input data for the trained function which is used to predict the performance value of the solar cell.

In yet another embodiment of the invention, the input data further comprises at least one process parameter regarding the processing of the solar cell. In particular, the process parameter may comprise physical or chemical properties of at least one of the substances used for processing of the solar cell, such as the composition of the material or its viscosity. In other words, in addition to the input data gained from EIS measurements, process parameters from the processing of the solar cell which is tested may be used to predict one or several performance values of the solar cell.

The process parameters may also comprise deposition parameters during a deposition process of elements of the solar cell. Here, the temperature, pressure, printing or spin coating parameters appear to be particularly valuable as input data.

Finally, also physical and chemical properties of the elements of the solar cell, such as the layer thickness, can be considered and added to the input data.

As output data, one or several performance values of the solar cell are provided. In particular, the performance value are chosen from the group of the short circuit current, the open circuit voltage, the voltage of the solar cell at the maximum power point (which is also referred to by the maximum power point voltage), the current of the solar cell at the maximum power point (which is referred to by the maximum power point current), the maximum power (which is the product of the maximum power point voltage and the maximum power point current), the fill factor (which is the product of the short circuit current and the open circuit voltage, divided by the maximum power) and the cell efficiency, which is also referred to as the photoconversion efficiency of the solar cell. These performance values are generally also referred to as "the main cell parameters" of a solar cell. A quantitative prediction of one or several of these parameters (or: values) give a concrete and quantitative estimation of the quality and performance of the solar cell.

According to the invention, an analytic function between the input data and the output data is not sought. Instead, a relation, which is called a function in this patent application, between the input data and the output data is set up. This function is trained such that it represents as best as possible the relation between input data and output data.

One approach to train the function is the application of multivariate statistics. Another approach is the use of neural networks, such as convolutional neural networks.

The function is trained according to the following method: Firstly, input training data is received, wherein the input data comprises exemplary data from electrical impedance spectroscopy applied to a perovskite-based solar cell or parts thereof. Secondly, output training data is received, wherein the output data comprises a performance value of the solar cell. The output training data is related to the input training data, which means that each output training data is associated (in other words: related) to input training data. In a third step, a function is trained based on the input training data and the output training data. This results in the fourth and last step: the provision of a so-called trained function.

Descriptively speaking, by providing sets of input/output training data, a function is trained. The function is able, once that the training is completed, to predict output data given unknown input data with the help of the training.

Further, the invention is also directed to a providing system, comprising a first interface, configured for receiving input data, wherein the input data comprises data from electrical impedance spectroscopy carried out on a perovskite-based solar cell or parts thereof, a second interface, configured for providing output data, wherein the output data comprises a performance value of the solar cell and a computation unit, configured for applying a trained function to the input data, wherein the output data is generated.

All embodiments and variants which have been discussed in context with the computer-implemented method also apply to the mentioned providing system. For the sake of conciseness, they are not repeated here expressis verbis.

Finally, the invention is also directed to a computer-readable medium comprising instructions which, when the program is executed by a providing system, cause the providing system to carry out a method according to one of the embodiments described above.

BRIEF DESCRIPTION OF THE DRAWINGS

In the following, the invention is illustrated by the help of the accompanying drawing, wherein.

DETAILED DESCRIPTION OF THE INVENTION

Figure 1:
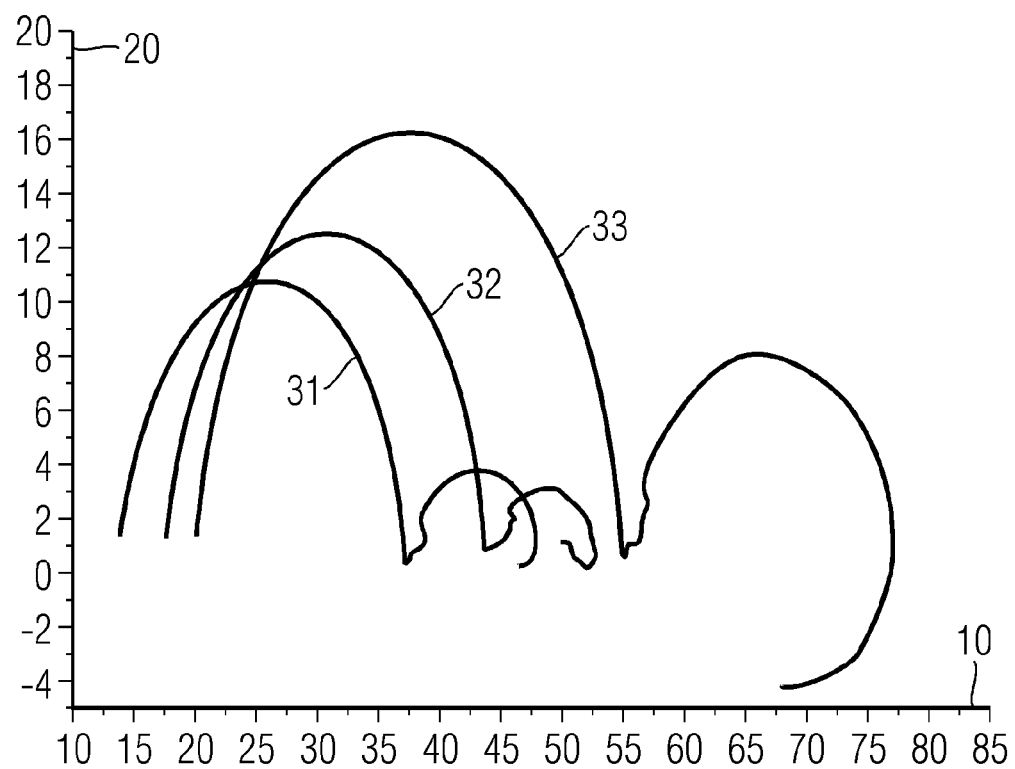
FIG. 1 shows Nyquist plots of three perovskite-based solar cells.

FIG. 1 shows frequency-dependent real and imaginary part of the electrical impedance in a form known as Nyquist plot. The real part of the impedance in Ohm is plotted at the abscissa 10, the imaginary part of the impedance in Ohm is plotted at the ordinate 20. The first Nyquist plot 31 and the second Nyquist plot 32 result from electrical impedance spectroscopy measurements carried on a first type of perovskite-based solar cells. They are two different cells, the first Nyquist plot 31 belonging to a first cell and the second Nyquist plot 32 belonging to a second cell, but both cells have been processed by the same process. The third Nyquist plot 33 results from electrical impedance spectroscopy measurements carried on a third perovskite-based solar cell. The third solar cell has been processed by a distinctly different process. Thus, the third solar cell may be attributed to a second type of perovskite-based solar cells.

The first solar cell features a high performance, thus leading to a good selected performance value. The selected performance value may e.g. be the photoconversion efficiency of the solar cell. The second solar cell features a low performance, leading to a poor performance value, in this example a low photoconversion efficiency.

By comparing the first Nyquist plot 31 and the second Nyquist plot 32, it can be seen that significantly different Nyquist plots are obtained for two solar cells which belong to the same type of solar cell but show a different performance. In other words, the difference in the performance value (in this example, the cell efficiency) is already visible in the Nyquist plots obtained from EIS measurements. A key aspect of the invention is that a trained function would be able to recognize (and hence, predict) the poor performance of the second solar cell from the Nyquist plot only.

FIG. 1 shows, however, that care needs to be taken if EIS measurements from different cell types are compared. The third Nyquist plot 33 belongs to a different cell type, compared to the first and second Nyquist plots 31, 32. Thus, a different function applies when predicting the performance value(s) of the third solar cell, which needs to trained separately.

Figure 2:
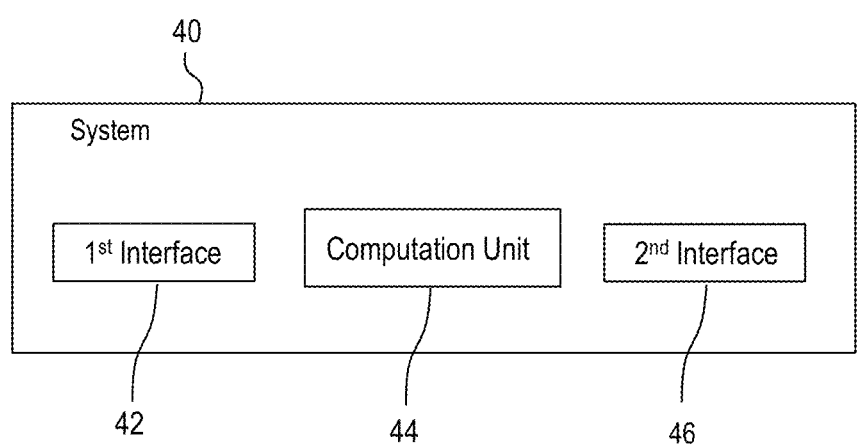
FIG. 2 is a block diagram of a system for determining a performance value of a solar cell that includes perovskite material.

FIG. 2 shows a block diagram of a system 40 for determining a performance value of a solar cell. The system 40 includes a first interface 42, a computation unit 44 and a second interface 46. The first interface 42 is configured for receiving input data. The input data includes data from electrical impedance spectroscopy carried out on the solar cell or parts thereof. The solar cell includes perovskite material. The electrical impedance spectroscopy is carried out inline during a manufacturing process of the solar cell. The computation unit 44 is coupled to the first interface 42, and is configured for applying a trained function to the input data. Output data is generated by the computation unit 44. The second interface 46 is coupled to the computation unit 44, and is configured for providing the output data. The output data includes a performance value of the solar cell so that the manufacturing process of the solar cell can be monitored based on the output data.

In essence, the present invention allows to predict the performance of a perovskite-based solar cell from EIS measurements, which otherwise would only be possible by sophisticated and costly I-V measurements at a solar simulator. The predicted performance can be valuable in several ways:

The obtained result can be used to select and categorize the cells during manufacturing. The categorization is useful to build photovoltaic modules with matching cells in order to optimize the performances of the individual modules.

The obtained result may also be used to optimize the production process itself. The measurements can be performed directly after an interim process step, i.e. before the processing of the cell is completed. In contrast to many investigative tools, EIS is non-destructive (just contacting with two electrodes is required). Thus, on the one hand, the obtained result may be used as a feedback to adjust a processing machine in order to optimize the process for the next batch. On the other hand, the result may be used to as a feedforward to the next processing machine in order to compensate deviations from the previous process step and thus "correct" the most recent batch. Particularly for tandem cells which require even more process steps (sometimes done at different manufacturers and shipped in between), EIS is a valuable tool for inspection of incoming preproducts before the processes at the next site start.

Yet another application of the present invention relates to the monitoring of a perovskite-based solar cell during its operation. As it is known, one challenge with perovskite-based solar cells relates to their potential degradation over time. The present method is also applicable to evaluate the degradation of the cell's performance over time independently of the illumination state. Although the aging mechanisms are generally known, the achievable stability during operation is not fully understood yet. For these reasons, perovskite-based solar cells may exhibit different degradation over time leading to a mismatch of cell performance in a module or in a power plant. This mismatch can be quantified using the described method in order to estimate the overall loss in yield. The expected loss can be partially compensated by adjusting the operation of the solar cell considering the EIS measurement results, e.g. to avoid complete degradation or destruction of the cells.

In already operating photovoltaic sites the performance of cells or modules over time can be measured. When using EIS, those measurements do not require a solar simulator providing well defined illumination but could be performed whenever suitable (e.g. at nighttime) without interrupting the normal day-to-day operation. The acquired data can be analyzed and presented to stakeholders online and in real-time.

In summary, an attractive concept to predict one or more performance values of a perovskite-based solar cell is presented. This concept cannot only be used monitoring and optimizing a production process of the solar cell, but also, for instance, to monitor the performance of a perovskite-based solar cell during its operation in the field.

LIST OF REFERENCE SIGNS 10 abscissa
20 ordinate 31 first Nyquist plot
32 second Nyquist plot
33 third Nyquist plot

The invention claimed is:

1. A method for operating a system comprising a first interface, a second interface and a computation unit coupled to the first and second interfaces, the method comprising:
receiving at the first interface input data, wherein the input data comprises data from electrical impedance spectroscopy carried out on a solar cell comprising perovskite material or parts thereof, with the electrical impedance spectroscopy being carried out inline during a manufacturing process of the solar cell,
operating the computation unit to apply a trained function to the input data, wherein output data is generated,
providing at the second interface the output data, wherein the output data comprises a performance value of the solar cell, and
monitoring the manufacturing process of the solar cell based on the output data.

2. The method according to claim 1,
wherein the data from the electrical impedance spectroscopy comprises impedance, admittance, modulus function, complex dielectric constant and/or dielectric permittivity of the solar cell or parts thereof.

3. The method according to claim 1,
wherein the data from the electrical impedance spectroscopy comprises data derived from modelling electrical equivalent circuits, based on electrical impedance spectroscopy carried out on the solar cell or parts thereof.

4. The method according to claim 1,
wherein the performance value of the solar cell is chosen from the group of short circuit current, open circuit voltage, maximum power point voltage, maximum power point current, maximum power, fill factor, cell efficiency.

5. The method according to claim 1,
wherein the input data further comprises at least one process parameter regarding the processing of the solar cell.

6. The method according to claim 5,
wherein the process parameter is chosen from the group of
physical or chemical properties of at least one of the substances used for processing of the solar cell,
deposition parameters during a deposition process of elements of the solar cell, and/or
physical or chemical properties of the elements of the solar cell.

7. The method according to claim 1,
wherein the solar cell comprises a photosensitive layer and the photosensitive layer contains the perovskite material.

8. The method according to claim 1,
wherein the electrical impedance spectroscopy is carried out at frequencies in the range between 100 mHz and 1 MHz.

9. The method according to claim 1,
wherein the electrical impedance spectroscopy is carried out at a limited number of pre-defined frequencies.

10. A computer-implemented method for providing a trained function, comprising:
receiving input training data, wherein the input data comprises exemplary data from electrical impedance spectroscopy applied to a solar cell or parts thereof and at least one manufacturing process of the solar cell, wherein the solar cell comprises perovskite material,
receiving output training data, wherein the output training data is related to the input training data, wherein the output data comprises a performance value of the solar cell,
training a function based on the input training data and the output training data, and
providing the trained function to represent a relation between the input data and the output data, which when the trained function is applied to the input data, the performance value of the solar cell is predicted in the output data.

11. A system, comprising:
a first interface, configured for receiving input data, wherein the input data comprises data from electrical impedance spectroscopy carried out on a solar cell or parts thereof, wherein the solar cell comprises perovskite material, with the electrical impedance spectroscopy being carried out inline during a manufacturing process of the solar cell,
a computation unit coupled to the first interface, and configured for applying a trained function to the input data, wherein output data is generated, and
a second interface coupled to the computation unit, and configured for providing the output data, wherein the output data comprises a performance value of the solar cell so that the manufacturing process of the solar cell can be monitored based on the output data.

12. A non-transitory computer-readable medium, comprising:
instructions stored thereon which, when the instructions are executed by a providing system, cause the providing system to carry out a method according to claim 1.

13. The method according to claim 3,
wherein the data derived from modelling electrical equivalent circuits, comprises serial resistance, capacity or Warburg impedance of the solar cell or parts thereof.

* * * * *